Sept. 23, 1952 A. G. LAZZERY 2,611,807

MULTIPLE BAND TURRET-TYPE TUNING SYSTEM

Filed June 30, 1949 2 SHEETS--SHEET 1

INVENTOR
Angelo G. Lazzery
BY H. L. Newton
ATTORNEY

Sept. 23, 1952 A. G. LAZZERY 2,611,807

MULTIPLE BAND TURRET-TYPE TUNING SYSTEM

Filed June 30, 1949 2 SHEETS—SHEET 2

INVENTOR
Angelo G. Lazzery
BY H. L. Newton
ATTORNEY

Patented Sept. 23, 1952

2,611,807

UNITED STATES PATENT OFFICE 2,611,807

MULTIPLE BAND TURRET-TYPE TUNING SYSTEM

Angelo G. Lazzery, Oaklyn, N. J., assignor to Radio Corporation of America, a corporation of Delaware Application June 30, 1949, Serial No. 102,367

24 Claims. (Cl. 175—298)

This invention relates to multiple band turret type tuning systems and the like, and more particularly to improved shielding and mounting structure therefor.

In a copending patent application for improvements in Band Changing Systems for High Frequency Signal Tuners and the Like, Serial No. 101,965, filed June 29, 1949, in the name of D. Mackey and assigned to the assignee of the present application, there is described a preferred form of signal tuner in which the present invention is incorporated. In this copending application the preferred tuner has a series of segments, each carrying selective circuit elements for one signal frequency band or channel, applied to a drum structure rotatably mounted with respect to a central axis to selectably switch the circuit elements on any of the segments into a signal transfer circuit and effect selection of desired signals. In that copending application the circuit elements are "printed" on the segments.

In the above type of tuning systems, the circuit elements are of necessity closely spaced to provide relatively short lead connection for suitable operation at the high frequencies involved. This introduces problems of how to conveniently mount the drum segments in compact form and yet sufficiently isolate the elements for proper operation.

It is a primary object of the present invention to provide a readily detachable mounting and shielding structure for interchangeable groups of circuit elements for such tuners.

A further object of the present invention is the provision of mounting structure for relatively rigidly and accurately holding interchangeable circuit units of a signal transfer system yet permitting the units to be readily attached, detached and replaced.

A still further object of the invention is the provision of an improved electric circuit unit for engagement by mounting structure which also provides shielding between as many circuit portions of the unit as is necessary to isolate.

The novel features that are considered to be characteristic of this invention are set forth with particularity in the appended claims. The invention itself, as well as additional objects and advantages thereof, will be more readily understood from the following description, reference being had to the accompanying drawings wherein:

According to the invention, there is provided an electric circuit unit in the form of an integral support holding a plurality of circuit elements and perforated for interfitting engagement with a mounting structure. By making the interfitting parts of the mounting structure electrically conductive, these parts will also function to electrically shield one or more of the circuit elements from the remainder of the circuit. The circuit elements can be in the form of conductive coating portions held on the support to further simplify the shielding.

Figures 1, 2, 3:
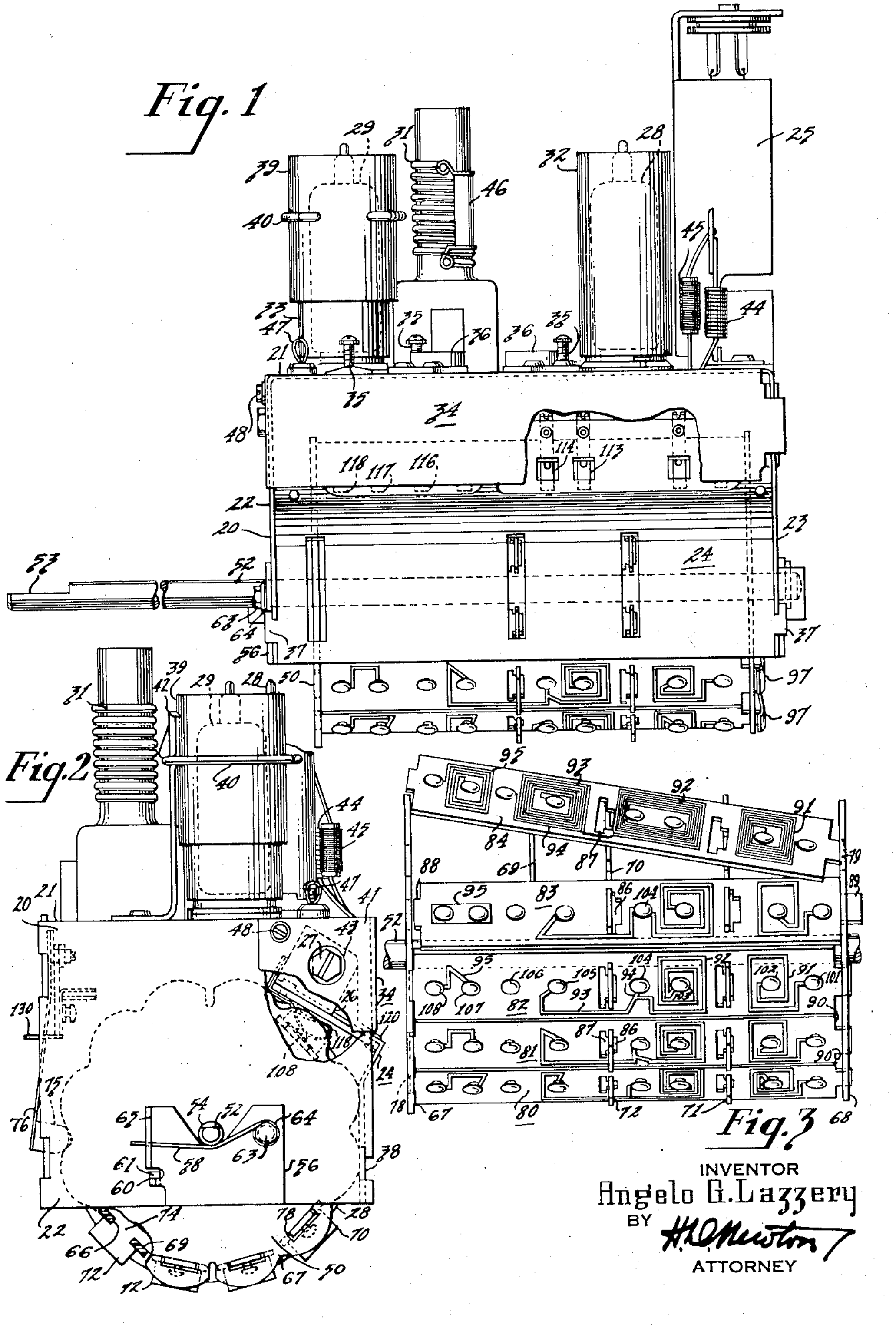
Figure 1 is a side view of a television tuner embodying features of the invention, with parts broken away to more clearly show some of the details.
Figure 2 is an end view, looking from the left of the television tuner of Figure 1, with parts broken away for clarity.
Figure 3 is a view of a portion of the signal-selecting elements of the tuner of Figure 1.

Referring to Figures 1, 2 and 3 in which like reference characters designate like parts, a television tuner providing an assembly of detachable and interchangeable selective circuit carrying segments and exemplifying one embodiment of the invention, comprises a box-like housing or chassis element 20 which carries on its upper or top surface 21 certain television input circuit components, including a unitary signal input matching network 25, a plurality of electron-discharge tubes 28, 29, an output inductor 31, and a plurality of adjustable capacitors 35 and 36. The tubes 28, 29 are provided with suitable shields 32, 33, one of which carries a heavy vibration damping cylindrical sleeve 39, held in place by a snap ring 40 encircling the sleeve 39 and an upright support arm 42. Other circuit elements such as certain inductors 44, 45, a capacitor 46 and a test connection terminal element 47 are also shown as externally carried on the housing top 21.

Within and partly projecting from and below the housing 20, a generally cylindrical selector drum or turret 50 is rotatably held on a shaft 52 journalled in slots extending up from the lower edges of the front and rear housing walls 22, 23. The upper portion of one of these slots is shown at 54 in Figure 2. A retaining plate 46 and retaining wire spring 58 hold and bias the shaft 52 upwardly against the top end of the slot 54. The plate 56 has an inwardly projecting ear 60 anchored in a perforation 61 of wall 22, and a screw or rivet 63 holds the plate securely against this wall. The shank of the rivet or screw 63 receives a loop 64 formed on one end of spring 58, the other end of the spring being engaged in a notched flange 65 projecting outwardly from the plate 56. The shaft 52 includes an extension having a flat 53 for receiving an operating knob (not shown).

The drum itself is more clearly shown in Figure 3 and includes a pair of thin, flat end discs 67, 68 and a plurality of thin, flat intermediate discs 69, 70, 71, all being of conducting material, rigidly held on the shaft 52 in predetermined spaced relation to each other. The periphery of end disc 67 is uniformly notched (see Figure 2) to provide spaced indentations or recessed cam surfaces 73 for engagement by a holding detent button 75 carried by a leaf spring 76 suitably secured to the housing. The detent 75 may be of any suitable type such as the round-ended finger or button as shown, or roller means of any well known form, for engaging the cam surfaces and intermediate notches provided on the disc 67.

Distributed circumferentially on equal radii around the discs 67, 68 and adjacent their peripheries, are elongated slots or notches 78, 79 in aligned pairs. Each pair of notches or slots is arranged to receive the corresponding tongued or shouldered ends 88, 89 of individual thin carrier strips or coil supports of insulating material, five of which are shown at 80, 81, 82, 83 and 84.

The intermediate discs, 69, 70 and 71 assist in holding and locking the carrier strips securely in place. Radially projecting peripheral blades 72 integral with discs 70 and 71 are aligned in rows corresponding to the carrier strips as shown in Figures 1 and 3. Each of the blades is notched in each edge as indicated at 66 to provide an outer head or locking lug attached to the central or body portion of the disc, as shown more clearly in Figure 2. The body portion is connected to the blades 72 by a neck 74 at the notches 66, and around this neck the strips are held. Aligned with the disc blades or locking lugs 72, each strip has a transverse passageway or locking slot 86 wide enough to receive the reduced neck portion 74 between the notches 66 (Figure 2), but not large enough to pass the outer head or locking lug end of the blade. Each strip is perforated by at least one mounting slot having two differently dimensioned inter-communicating slot portions comprising a short transverse slot 86 parallel with and opening into a longer transverse slot or passageway 87 wide enough to pass the locking lugs or heads of the blades 72. To allow longitudinal motion of the individual strips with respect to the discs 67 and 68, whereby locking to the lugs 72 may be effected, one end of each carrier strip is cut away, to provide shoulders 90, 90 that fall short of spanning the distance between the end discs 67, 68 when the other end 88 is seated in the opposite disc.

With this arrangement, the strips may readily be mounted or removed from the tuner, and are rigidly held in place when mounted, as is necessary for the band change switching. For mounting a strip, its elongated end or tongue 89 is first inserted in a notch 79 of disc 68, as indicated by the position of strip 84 in Figure 3. The strip is then moved to the right to bring the shoulders 90, 90 against the right-hand disc 68, the longer locking slots 87 being thereby positioned to fit over the enlarged heads 72 of the spaced supporting discs. The strip is then pivoted about the shoulders 90, 90, to bring the longer slots 87 over the projecting heads 72 of the intermediate discs 70, 71 and against the outer seating edges of discs 70, 71, as well as the periphery of disc 69. The strip 83 is shown in this position. Finally the strip is urged to the left, as seen in Figure 3, to bring the tongue or shouldered end 88 into a notch or slot 78, thereby moving the shorter locking passageways or slots 86 into the notches 66 and around the reduced necks 74, thus locking under the heads 72. Spring arms 97 (Figure 1) externally carried by the end disc 68, are provided, one for each removable unitary strip or segment, in engagement with the tongues 89, whereby the strips are biased to and held in the locked position, to the left, as shown for strips 80–82 inclusive.

To remove a strip it is first moved to the right against the resistance of spring arm 97, to the position in which strip 83 is shown in Figure 3, to disengage end 88 from its slot 78 and align longer passageways 87, 87 with the heads 72, 72; the end 88 then tilted out about shoulders 90, 90 as shown by strip 84; and the strip end 89 is then withdrawn from notch 79.

The separate strips each carry one or more portions of a selective signal circuit, for selecting signals in a particular frequency band or channel. The circuit portions, comprising tuning and like inductor elements, shown on strip 82 for example, are in the form of suitably shaped flat conductors provided by a conductive stratum on the non-conductive surface of the strip. Referring by way of example, to the circuit elements carried by the strip 82, these include an input tuning inductance 91, a coupling inductance T-network including branches 92, 93, and stem 94, and an oscillator tuning inductance 95. The strips also carry a set of terminal contacts 101—108 to which the ends of the individual inductances are connected as shown. On some of the strips, as shown for example on strip 83, the coupling T-network may omit one or more of the T-elements such as its stem 94, other portions of the circuit supplying the omitted structure. In this event the remaining elements are connected to a contact as shown at 104, on the strip 83 for example. The contacts project radially outwardly from the outer surface of the strip, for switching connection with external circuits, as more clearly illustrated in Figures 2 and 4, and also provide convenient means by which the strip may be grasped and moved for mounting and demounting purposes.

For some frequencies an inductor may merely be a relatively short length of straight conductor, as shown by the oscillator inductance element or inductor 95 of strip 83, which is suitable for the standard television channel number 13. At other frequencies the inductive coating or stratum may be quite extended, as shown by the inductors of strip 84 which is highly effective with the standard television channel number 2.

For selecting signals from a specific television channel, the drum 50 is rotated so as to bring the circuit elements of a selected one of the strips into operative connection with the remainder of the television signal-receiving system. In Figure 1 this connection is provided by a set of fixed contacts 111–118 inclusive, held on the housing 50 for cooperation with contacts of a strip at a suitable point in the rotation path of the drum. As shown, the contacts 111 to 118 inclusive are fixed to a non-conductive terminal board 120 held on an angularly shaped side wall plate or bracket 24 of the housing. The plate 24 is secured to the remainder of the housing 20 by ears 26 fastened to the end walls 22, 23 as by screws 27, and additional ears 37 interlockingly engaging suitably shaped notches 38 in these end walls. A cover plate 34 may be provided to cover the terminal board 120, and may be secured to the housing as by an ear 41 bent to overlie the end wall 22 and fastened by screw 48. An opening 43 in ear 41 provides clearance for the screw 27.

The movable contacts 101 to 108 are in the form of rivets which penetrate the body of the strip and have a head with a generally convex outer surface projecting out from the conductive circuit portion. The rivets may be solid or hollow and can be applied in any desired fashion.

The stationary contacts 111–118 inclusive are each in the general shape of an elongated closed loop, as shown by the contact 118 in Figure 2, and present a contact portion extending substantially along the travel path of a contact rivet in each tuning segment. For each movable contact on a segment, one contact is provided and is made somewhat resilient for suitable wiping engagement between the contacts.

The specific features of the contacts do not form any part of the present invention and are included in the copending patent application for improvements in Electrical Switch Contact Arrangements, Serial No. 101,966, filed on or about June 29, 1949, in the name of D. Mackey. For the purposes of the present invention, any suitable form of contacts can be utilized.

For delivery of the received signals selected by the tuner, a set of contact lugs 130 may be mounted to project from a wall of the housing, as shown in Figure 2. The desired circuits for further amplifying the selected signals are connected to these lugs. Some of the lugs may be used to supply operating energy to the tuner, as for example, to heat the tube cathodes and provide the energizing potentials to the tube electrodes.

Figure 4:
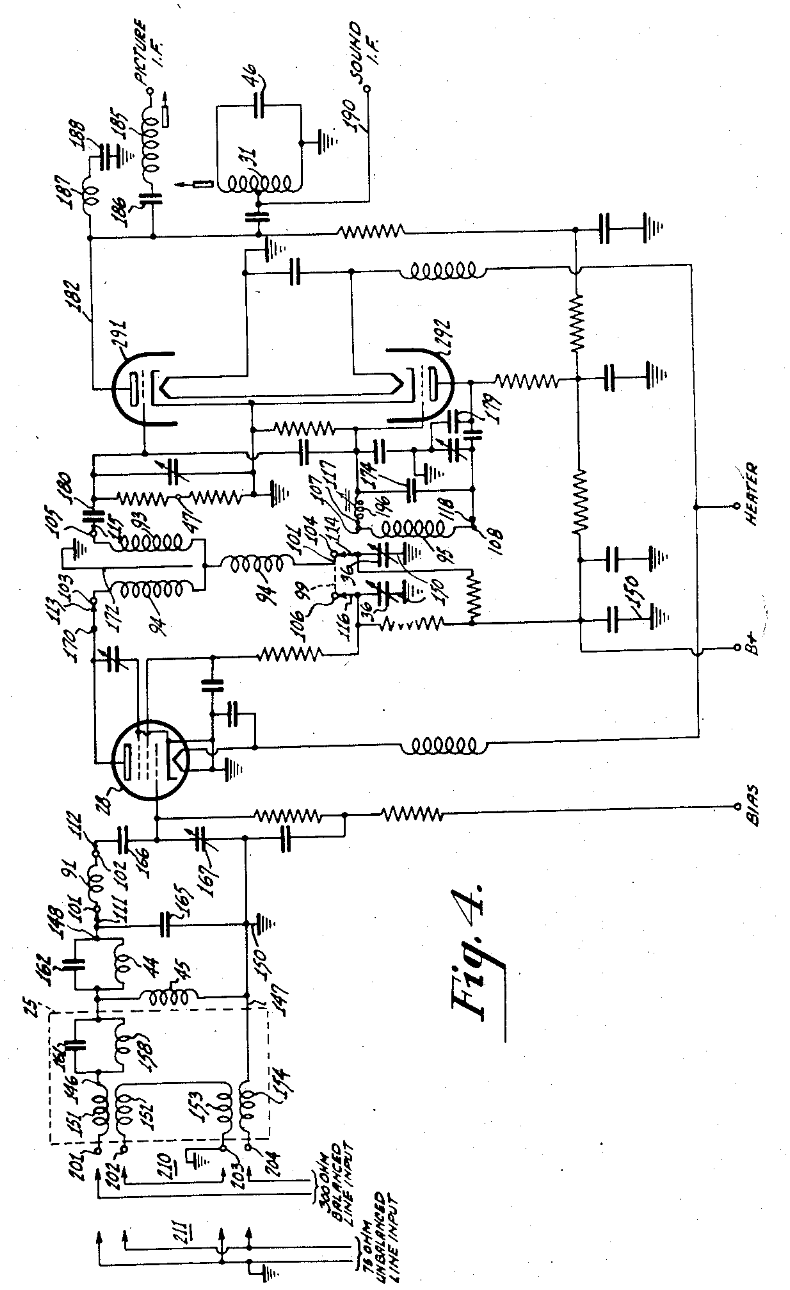
Figure 4 is a circuit diagram of a complete tuner circuit in which the system of the invention can be incorporated.

Figure 4 is a circuit diagram of a television tuner circuit highly suited for the tuner of Figure 1. Terminals 201, 202, 203, 204 provide input signal supply connections to a so-called "elevator" input transformer consisting of four inductances 151, 152, 153, 154 held in casing 25 and having output leads 146, 147. Inductances 151 and 152 may be in the form of closely coupled bifilar windings spaced from the other inductances 153, 154 which may also be closely coupled bifilar windings. By providing such inductance pairs each equivalent to a transmission line of 150 ohm impedance, a standard 300 ohm balanced line, such as is conventionally used for antenna leads, may be connected to supply signals to terminals 201 and 204, terminals 202 and 203 being joined. Such a connection is schematically represented by the assembly 210. Unbalanced 300-ohm output connections may then be directly matched to output leads 146, 147 of the transformer, that is, one of these output leads may be grounded as shown.

However by uniting terminal 201 with terminal 203, and uniting terminal 202 with terminal 204, a pair of input connections are made available for directly receiving signals from a standard 75 ohm coaxial or unbalanced transmission line, and also delivering 300 ohm unbalanced signals at output leads 146, 147. This connection is schematically represented by the assembly 211. Furthermore, if the input terminals are not grounded, a balanced 75 ohm line can be connected in place of the unbalanced 75 ohm line, and the transformer than also provides impedance matching to a 300 ohm unbalanced output. In addition to the above, an unbalanced 300 ohm input line may be connected to terminals 201, 204, in place of the balanced input assembly 210 and thereby also deliver an unbalanced 300 ohm output to leads 146, 147. The transformer input is accordingly suitable for use with any of the conventional standard signal supply lines.

As shown, lead 147 is grounded and a fixed high-pass filter, including inductances 158, 44, 45 and capacitances 161 and 162, is connected in the elevator transformer output circuit. This filter combination, part of which may be included within the casing 25, is arranged to have a low frequency cut-off which permits passage of signals having the lowest desired frequency. For improving the selection, the high pass filter may be arranged to provide a particularly high attenuation for undesired signals of a specific frequency below the nominal cut-off limit, for example intermediate frequency signals radiated from other similar receivers or signal transmitters, as by parallel tuning inductances 158 and 44 to this frequency with their respective capacitances 161, 162. This makes a highly effective arrangement for suppressing interference by undesired signals.

The output leads from the high-pass filter are 147 and 148, and a selectable low-pass filter, including inductance 91 and capacitances 165, 166, 167, connects these leads 147, 148 to the input electrodes of tube 28. Stray wiring capacitance and the input capacitance inherent in tube 28 are taken into account in the filters. Inductance 91 is selectably switched for the different signal channels, as indicated by the contacts 101, 111 and 102, 112. The individual inductances 91 are of such characteristics as to tune the circuit to pass the desired signals but block passage of those at higher frequency.

Tube 28 is connected in a more-or-less conventional amplification circuit, its amplified output being developed between output lead 170 and the common return conductor 150, across branch 92 and stem 94 of the inductive T-network 92, 93, 94. This T-network functions to pass a selected band of frequencies to the next stage. One or more capacitors 36 may be arranged for connection in series with the coupling stem 94, and can be adjusted to series tune the coupling stem to any frequencies which it is desired not to be transferred by the T-network. Thus for example, by tuning the stem 94 to series resonate at about the heterodyne image frequency where undesired signals may beat with the oscillations supplied to a later stage and thereby be passed to the tuner output to interfere with the desired signals, such interference may be sharply reduced.

Where signals at widely different frequencies are to be received, as in the standard type television systems covering the range of from about 50 megacycles per second to over 200 megacycles per second, it is sometimes preferred to use more than one tuning capacitance to increase the effectiveness of image rejection over the entire tuning range without unduly sacrificing any of the desired band-pass characteristics. In Figure 4 two tuning capacitors 36, 36 are shown, one to tune the stem 94 at the higher television frequencies and the other to tune it at the low frequencies. Dash line connection 99 may be substituted for, or added to the stem lead 101 in the low frequency channels, the full line connection alone being used in the high frequency channels.

As shown at 103, 104, 105 and 106, the elements 92, 93, 94 of the T-network are switched for the different individual frequency channels, and are provided on different channel strips 80, 81, 82, etc. The cooperating fixed contacts are shown at 113, 114, 115 and 116. The omission of lead 99 and its contact 106 from some of the channel strips would mean that the cooperating fixed contact 116 would be free to vibrate, if of the resilient looped construction shown in Figure 2. This vibration is prevented by providing a dummy contact 106 on each strip not using connection 99. In this manner the contact 116 is always kept under mechanical bias when signals are received and any tendency for microphonic operation, by reason of the electrical variation resulting from contact vibration combined with subsequent amplification, is avoided. For the same purpose, a corresponding dummy contact 104 may be provided when only one of the capacitors 36 is used at low frequencies.

For improving the signal transfer and image attenuating characteristics of the T-network, the branches 92 and 93 are shielded from each other so as to restrict the transfer of any electric waves except by way of the inductance 94 which is common to both the input and output branches of the coupling network. The shielding is shown at 172 in Figure 4 and is provided by the projecting heads 72 of intermediate disc 70. The heads 72 accordingly function both as readily detachable interlocking strip mounting structure, and at the same time contribute shielding wherever desired.

Another shield, shown in Figure 4 as a grounded conductor 171, helps to isolate inductor 91 from the nearby portions of the mixer or heterodyne circuit. This shield is similarly provided by the projecting interfitting heads 72 of intermediate disc 71 in Figure 3. No shielding is needed between inductors 93 and 95 in the segment strips of the turret 50 inasmuch as the signals carried by these inductors are intended to be mixed in the tube section 291 to provide the desired heterodyne action. If additional shielding is needed, however, as for example where other types of circuits are used, another set of interfitting heads 72 and mounting slots 86, 87, is readily provided.

The coupling inductance 94 is preferably only a small fraction of the branch inductances 92, 93, and thereby provides the desired low coefficient of coupling. With increasing signal frequencies, inductances 92, 93 and 94 each become smaller until at the highest frequencies the coupling stem 94 may be so small as to be provided by the length of conductor between the junction of branches 92, 93 and the associated capacitor 36. This branch construction is shown on strip 83 in Figure 3.

By means of lead 180, the signals transferred to the output branch 93 are delivered to the signal input electrode of mixer stage, including tube section 291, where they are heterodyned with oscillations generated by oscillator stage including tube section 292. The two tube sections may together be the dual sections of a single tube 29, or they may be provided by separate tubes. The oscillator stage includes fixed inductance 95, adjustable inductance 196, and capacitance 174 connected in a parallel-resonant circuit which determines the frequency of the mixer oscillations. Other capacitors may be connected in this resonant circuit as shown, to accurately adjust the resonant frequency of the frequency-determining circuit.

A single adjustable inductance 196 is shown as providing any necessary compensation for variations in the inductance of the remainder of the frequency-determining circuit.

The mixer output which is developed in tuner output circuit between mixer output lead 182 and ground, includes heterodyne or beat signals corresponding to the sums and differences of the incoming signal frequency and the oscillation frequency as well as of multiples of each of these frequencies. The desired beat signals are selected by suitable tuned elements connected in this output circuit. In the form shown in Figure 4 a series-resonant combination of inductance 185 and 186 is tuned to selectively pass the video or picture signal portion of the selected beat waves, while a parallel-resonant combination of inductance 31 and capacitance 46 is tuned to present a relatively high impedance to the sound signal portion of these beat waves. A lead 190 from the sound circuit supplies the sound signals to the subsequent stages where they are further amplified, demodulated and reproduced in any desired manner. The picture signals are also further amplified, demodulated, and reproduced.

To improve the uniformity of response by the tuner to all the television channels, a series-resonant circuit 187, 188 is tuned to a frequency intermediate the high and low frequency channels. This has the effect of reflecting into the input circuit of triode 291 a positive resistance for signals in the low channels, and a negative resistance (some regeneration), for signals in the high channels. The normal variation in resistive loading applied by the tube to the incoming signals is thereby compensated. Such use of reflecting elements in the output circuit of an amplifier is explained in Sylvania Engineering News-Letter, number 85, dated April 30, 1946.

The oscillator is effectively operated on the high frequency side of the incoming signals so that the video and sound beat signal frequencies correspond to the difference between the incoming frequencies and the oscillator frequency. The oscillator can, however, be operated on the low frequency side or it may for some channels be on the high frequency side and for others on the low frequency side, with similar results.

The inductor 95 of the oscillator is also shown as switched for the different frequency channels, each selector strip carrying an inductor properly selected for accurately tuning the corresponding signals. One of the variable condensers in the oscillator stage, condenser 179 for example, may be provided with an externally available adjustment control so that the precise tuning adjustment may be manually made for each channel. Such a precise or fine tuning adjustment may be arranged for operation by a separately rotatable sleeve shaft surrounding drum shaft 52 and penetrating into the housing 20. The fine tuning capacitor may be conveniently located in the space between wall 22 and disc 67 in the tuner construction of Figure 1.

If desired, however, the oscillator may be provided with automatic frequency control elements connected to respond to the amplified signals and to automatically shift the tuning of the oscillator's resonant circuit and compensate for any frequency shift of the amplified signals from the desired value. Such automatic frequency control circuits are well known in the art and need no further description here.

For test purposes, the auxiliary lead 47 may be inserted in the input circuit of the mixer stage as shown in Figure 4.

The circuit elements carried by the individual channel strips 80, 81, 82 etc., are provided by a photo-etching process the etching portion of which may be similar to that described in U. S. Patent No. 1,582,683. One highly effective technique is to first secure a metal foil about 1.5 mils (0.0015 inch) thick to a substantially non-conductive carrier sheet. Copper foil on a polymerized phenol-formaldehyde resin sheet produces excellent results. The exposed foil surface is then coated with any suitable photo-sensitive layer of the type generally employed in the photo-engraving art. The standard alkaline solution of bichromated shellac commonly known as cold top enamel makes a suitable coating. The coating is kept in subdued light till it is exposed to an intense image of the desired circuit, the conductive circuit portions being light and the background being dark. After a sufficient exposure time, the photo-sensitive coating is treated with a developer, essentially ethyl alcohol where cold top enamel is the photosensitive coating, which softens those parts of the coating that have not been exposed to the intense light. The developed coating is then washed in running water, which washes off the softened portions. The washing may be assisted by some mechanical rubbing, as with a sponge, to completely detach loose portions.

The sheet with the remaining portions of the coating is then subjected to an etching treatment, preferably of the spray type, in which etching fluid that dissolves the metal foil is sprayed against the partially coated surface to be etched. The metal is thereby dissolved from all portions unprotected by cold top enamel, leaving an accurate reproduction of the photographic image. The protecting layer may then be partially or completely removed from the protected metal with a suitable solvent, such as a 25 percent solution of sodium hydroxide in water by weight. Only those portions of the photo-etched metal circuit need be uncovered where connections are to be made. If desired soldered connections can be made directly through the cold top enamel. The enamel film is generally so thin, a fraction of a mil in thickness, as to not interfere with the soldering process. Additional details including specific formulations of various necessary preparations, as well as further variations of the photo-etching process are more completely described in the book entitled "Modern Photoengraving" by Louis Flader and J. J. Mertle, copyrighted 1948 by Modern Photoengraving Publishers, Chicago, Illinois.

Channel strips may be made according to the above photo-etching method in large quantities. The circuit elements of a plurality of strips may be simultaneously prepared on a single large sheet of carrier material after which the sheet can be cut into the individual strips.

Substantially any conductor can be used to form the circuit elements such as the conductive strata of the individual segments. Copper and silver are preferred inasmuch as they combine high electrical conductivity with low corrosion and relatively low cost. Aluminum can also be used. Zinc is satisfactory but is improved by a protecting layer such as varnish, to reduce its corrosion under atmospheric influences.

The specific features of the method of preparing the circuit elements are not part of the present invention. Other so called printed circuit applying methods can also be used. Thus for example a printing plate or stencilling arrangement can be provided for applying conductive coatings or inks at localized areas corresponding to the configuration of the desired circuit elements. Practical methods hitherto developed include the application through a silk screen stencil of a paint containing a high concentration of finely divided particles that are conductive or become conductive after suitable treatment such as heating or firing. Powdered silver or decomposable silver compounds provide suitable conductive particles, and may be suspended in or mixed with in a suitable vehicle such as a lacquer. Examples of such practical conductive compositions are given in the National Bureau of Standards Circular 468 issued November 15, 1947 and entitled Printed Circuit Techniques, although other compositions can also be used. Resistors are also applied as coatings in an analogous manner, suitable resistance compositions being used. The same Bureau of Standards circular gives examples of practical resistor compositions. Other suitable circuit preparing methods are described in the National Bureau of Standards Miscellaneous Publication 192, issued November 22, 1948, and entitled New Advances in Printed Circuits.

The present invention is not restricted to any specific forms of circuit components. Thus for example the switched circuit sections may have one or more inductors in the form of standard windings or coils of wire, or these sections may be devoid of inductors and only include capacitors or other circuit elements. Combinations of all types of circuit elements can also be used.

For attaching the contacts, such as those shown at 101 to 108 inclusive, the strips are punched at the desired locations and the contacts inserted and riveted in place. Before insertion, the contacts may have their circuit-engaging surfaces coated with a soldering composition, so that after heading over, the contacts may be heated to effect soldering and establishing good electrical engagement. The contact receiving sections of the circuit stratum may be enlarged to assure proper engagement regardless of some variation in the position of the contacts.

The dielectric or substantially non-conductive material forming circuit-carrying structure of the invention may be of any convenient composition. When the circuit elements are carried as conductive coating portions the carrier or support sheet does not contribute any appreciable losses to the circuit. Phenol-formaldehyde resins are highly effective, and may include powered mica filler if desired. Compositions such as polyethylene (highly polymerized ethylene) or polystyrene (highly polymerized styrene) are also suitable.

With the above described methods any desired circuit segment can be easily made, no matter how complicated the circuit components.

According to modifications of the invention, the shielding structure between adjacent circuit elements need not have a locking engagement with the circuit unit but may merely provide a reenforcing support. Thus by making the heads 72 and the necks 74 of about the same width, the shielding projections will still support their strips against displacing forces directed laterally or radially inwardly with respect to the drum axis. These are the directions in which forces are applied to the strips by the cooperating contacts 118 during use. The mounting slot may in this modification be of uniform transverse dimension.

The strips may also be arranged to carry their circuit elements on the surface which faces the drum axis or, more generally, the root from which the shielding members are supported. In such an arrangement, the shield extensions need not project beyond the outer surface of the strips to provide the desired shielding. Of course, where circuit connections, such as those indicated at 93 in Figure 2, are to span the shield structure, the seating surfaces 69 may be suitably cut away so as to isolate the connection from the shield.

Where locking engagement is provided between shield and strip, the locking is not limited to being effected by strip movement transverse to a mounting slot but may involve other movements such as rotation of the strip around the locking shield, after the strip is lowered over the shield. For this purpose only one locking shield is provided per strip and the mounting slot portion that engages neck 74 is in the form of a circle that opens into slot portion 87. Additional reenforcing but non-locking shield supports may be provided to further support the strip after it is rotated into place. In this type of construction the non-locking supports can project somewhat so as to require some bending of the strip to ride over these projections as it is rotated into place. When in place, the projecting portions effect the desired shielding. The normal yieldable resiliency of the strips may be relied upon for permitting it to deform somewhat and carry those portions to be supported over the projecting shield supports where they will snap in place against the supports when they reach the proper mounting position.

While several exemplifications of the invention have been indicated and described above, it will be apparent to those skilled in the art that other modifications may be made without departing from the scope of the invention as set forth in the appended claims.

What is claimed is:

1. An electric circuit unit for mounting in a signal transfer apparatus and having a plurality of electric circuit elements for cooperation in a selective signal transfer circuit held by said apparatus; said unit including an integral support structure on which all of said circuit elements are held, said support structure being perforated by at least one mounting slot having two differently dimensioned intercommunicating slot portions extending in generally parallel relation in one direction across said support structure, and said support structure having reduced mounting ends extending out substantially perpendicular to said direction.

2. The combination as defined by claim 1 in which the support structure is a sheet member having a substantially non-conductive surface, and the circuit elements are electrically conductive coating portions held on said surface.

3. The combination as defined by claim 1 in which some of the circuit elements are held on opposite sides of said slot portions and electrically conductive mounting structure penetrates said slot portions to provide shielding means between elements on either side of said slot.

4. An inductance containing unit for selectable incorporation in a signal-transfer circuit of a transfer apparatus to selectively transfer electrical signals in a predetermined frequency channel, said unit including a set of inductance elements held on an integral support structure; said structure including at least one mounting slot having two differently-dimensioned communicating slot portions extending in generally parallel relation in one direction across the structure for mounting the unit as part of said apparatus, and said support structure having reduced mounting ends extending out substantially perpendicularly to said direction.

5. The combination as defined by claim 4 in which the set of inductance elements includes inductance portions on opposite sides of said slot portions and metallic locking lugs extending through said slot portions to provide shielding means between adjacent circuit elements on either side of said slot.

6. The combination as defined by claim 4 in which the support structure has an essentially non-conductive surface and the inductance elements are electrically conductive coating portions adherently bonded to said surface.

7. In a signal transfer system for receiving and selectively transferring alternating electric signals in a predetermined frequency range; mounting structure including retaining elements; a plurality of signal transfer circuit elements held on an integral support member; said support member being perforated by at least one slot having two differently dimensioned interconnected slot portions; and retaining elements some of which penetrate through said slot, interlocking with said slots to hold said support member in place.

8. In a signal transfer system for receiving and selectively transferring alternating electric signals in a predetermined frequency range; mounting structure including retaining elements; an integral support member, a plurality of inductance elements held thereon; said support member being perforated by at least one slot having two differently dimensioned interconnected slot portions, and being interlocked in place by said retaining elements some of which penetrate through said slot.

9. The combination as defined by claim 7 in which some of the circuit elements are held on opposite sides of the slot, and the retaining elements penetrating said slot are electrically conductive for shielding the oppositely held circuit elements from each other.

10. The combination as defined by claim 8 in which the support member is slotted between inductance elements, and the retaining elements include arms projecting from the mounting structure and extending through the support slots to provide shielding between said last-mentioned inductance elements, and said projecting arms interlocking with the support member portions adjacent the slots for retaining the support member in place on the mounting structure.

11. The combination as defined by claim 10 in which the projecting arms have outer end portions and inner neck portions, the outer end portions being larger in transverse dimension than inner neck portions; the support slots have a mounting portion opening laterally into a locking portion; the mounting portion being large enough to admit the outer arm end portions, and the locking portion being large enough to receive the neck portions of the arms and small enough to prevent longitudinal passage of the projecting arm end portions; and the mounting structure includes bias means for laterally urging the locking slot portions of the support structure into locking engagement with the arms.

12. In a selector system for selectably transferring high frequency electric signals in any of a multiplicity of signal channels: mounting structure including relatively fixed and relatively movable portions; a signal-transfer circuit held on both of said mounting structure portions and having a multiplicity of selective networks each including a plurality of selector elements for selectively passing signals in one of the channels along the signal-transfer circuit; an integral support structure holding all of said selector elements for at least one channel; the support structure being slotted and mounted on the relatively movable mounting structure portion for selectably bringing the different sets of channel selector elements into cooperating relation with a circuit section on the relatively fixed mounting structure portion; the relatively movable mounting portion including projecting arms have outer end portions larger in transverse dimension than inner neck portions; the support slots having a mounting portion opening laterally into a locking portion; the mounting portion being large enough to admit the outer arm end portions, and the locking portion being large enough to receive the neck portions of the arms and small enough to prevent longitudinal passage of the arm end portions; and bias means for laterally urging the locking slot portions of the support structure into locking engagement with the arms.

13. In a selector system for selectably transferring electric signals in any of a multiplicity of television signal channels: mounting structure including relatively fixed and relatively movable portions; a signal-transfer circuit held on both of said mounting structure portions and having a multiplicity of selective networks each including a plurality of selective inductance elements for selectively passing signals in one of the channels along the signal-transfer circuit; an integral carrier structure holding all of said selective elements for at least one channel; the carrier structure being slotted between different selective elements and being mounted on the relatively movable mounting structure portion for selectably bringing the different sets of selective elements into cooperating relation with a circuit section on the relatively fixed mounting structure portion; the relatively movable mounting portion including electrically conductive projecting arms have outer end portions larger in transverse dimension than inner neck portions; the carrier slots having a mounting portion opening laterally into a locking portion; the mounting portion being large enough to admit the outer arm end portions, and the locking portion being large enough to receive the neck portions of the arms and small enough to prevent longitudinal passage of the arm end portions; and bias means for laterally urging the locking slot portions of the carrier structure into locking engagement with the arms and interlockingly holding the electrically conductive arms in shielding relation between said different selective elements.

14. The combination as defined by claim 8 in which the inductance elements held on the support are conductive coating stratum portions bonded to a surface of the support.

15. An electric circuit unit for mounting in a signal transfer apparatus and having a plurality of electric circuit elements for cooperation in a selective signal transfer circuit held by said apparatus; said unit including an integral carrier structure having an electrically substantially non-conductive surface on which said circuit elements are held as electrically conductive portions coated on said surface; said elements being spaced apart and the carrier structure including a conductive locking lug extending between said spaced apart elements in engagement with a mounting shield support in said apparatus.

16. In a signal transfer system for receiving and selectively transferring alternating electric signals in a predetermined frequency range: mounting structure including electrically conductive supporting elements; a plurality of signal transfer circuit elements held on an integral carrier member; said carrier member including a conductive locking lug held by said supporting elements, and said circuit elements being distributed on opposite sides of said lug for shielding from each other by the locking lug.

17. In a circuit selecting unit, a housing element, a selector drum rotatably journalled in said housing element, said selector drum comprising a plurality of discs of conducting material perpendicular to the axis of rotation of said drum, a plurality of thin insulating carrier strips distributed circumferentially on equal radii around a pair of said discs, each of said strips carrying portions of a selective signal circuit and a set of terminal contacts connected to said signal circuit portion, a set of fixed contacts held on said housing for cooperation with the contacts of one of said strips at a suitable point in the rotation path of the drum, each of said strips having a locking slot of two differently dimensioned intercommunicating slot portions intermediate the ends thereof, an intermediate disc having integral radially projecting peripheral blades notched to provide an outer head and a body portion interlocking with the smaller of said slot portions to prevent radial or peripheral movement of said strips, and spring arms associated with one of said discs for longitudinally biasing said strips into an interlocked position on said blades, the larger of said slot portions being adapted to fit over the outer head of said blades for readily disengaging said strip from said drum when urged against said spring arms.

18. A circuit component selector comprising a frame and a circuit selector drum rotatably mounted in said frame, said frame having a plurality of stationary contacts adapted to be connected to portions of electrical circuits, said selector drum comprising at least two discs in spaced parallel relation, concentric with and perpendicular to the axis of rotation of said drum, a plurality of dielectric panels disposed parallel to the axis of rotation and in spanning relation between two of said discs, each of said panels having reactance components secured thereto and contacting members adapted to selectively connect said reactance components to said first mentioned stationary contacts upon selective positioning of said drum, both ends of each of said panels and the corresponding discs being formed with interlocking members adapted to prevent respective radial or peripheral movement, an intermediate disc and an intermediate portion of each of said panels being formed with interlocking members, and resilient means associated with one of said discs to secure said panels against longitudinal movement, thereby urging said panels into interlocking position with said intermediate disc.

19. In a circuit selecting unit adapted for use as a selector in television or like apparatus, a rotatable switching drum including spaced mounting discs disposed in parallel relation and normal to the axis of the drum, and means for releasably securing a plurality of component-supporting panels in an annular series about said axis and in spanning relation between said discs, said means comprising slots in both of said discs for interlocking engagement with both ends of each of such panels, to hold such end against both radial and circumferential displacement, an intermediate disc, radial lugs about the periphery of the intermediate disc, portions on said panels interlocking with said radial lugs, and retaining means for individually engaging and releasably holding such other ends of such panels in interlocking position with said lugs and comprising a spring disc secured to the outer face of one of said mounting discs and having individual spring arms formed integrally therewith and projecting generally radially, each of said arms having means at the end thereof to urge one end of one of such panels in a longitudinal direction.

20. A circuit selecting unit comprising in combination, a plurality of panels supporting electric circuit elements adapted for cooperation in a selective signal transfer circuit, a rotary type support structure for said unit, interlocking means on said support structure for holding said panels, and resilient means carried by said support structure individually urging each of said panels into interlocked position upon said support structure.

21. A selecting unit as defined in claim 20 wherein said support structure comprises two end discs having slots therein and said panels having end members adapted to register snugly in said slots thereby to prevent displacement of said panels on said support.

22. A selecting unit as defined in claim 21 wherein one of said end members is provided with shoulders, and wherein said resilient means provides a longitudinal thrust against the opposite end member to urge the circuit elements into registry and seat said shouders against said disc.

23. A selecting unit as defined in claim 20 in which there is provided, an end disc and interlocking structure in one end of said panels and said disc, and in which said resilient means longitudinally urges said panel into interlocked position with said disc.

24. A selecting unit as defined in claim 23 in which intermediate interlocking means is provided between said disc and said resilient means.

ANGELO G. LAZZERY.

REFERENCES CITED

The following references are of record in the file of this patent:

UNITED STATES PATENTS

| Number | Name | Date |
|---|---|---|
| 1,022,575 | Beehler | Apr. 9, 1912 |
| 1,579,360 | Hartwig | Apr. 6, 1926 |
| 1,830,701 | Jacobsen | Nov. 3, 1931 |
| 1,938,410 | Van Billiard | Dec. 5, 1933 |
| 1,989,620 | Lee | Jan. 29, 1935 |
| 2,028,587 | Brustlein | Jan. 21, 1936 |
| 2,078,908 | Harrison | Apr. 27, 1937 |
| 2,226,745 | Schrack | Dec. 31, 1940 |
| 2,343,284 | Dodington | Mar. 7, 1944 |
| 2,474,988 | Sargrove | July 5, 1949 |
| 2,496,183 | Thias | Jan. 31, 1950 |

FOREIGN PATENTS

| Number | Country | Date |
|---|---|---|
| 334,978 | Great Britain | Sept. 18, 1930 |
| 562,577 | Great Britain | July 7, 1944 |